United States Patent
Willcock et al.

(10) Patent No.: US 10,467,218 B2
(45) Date of Patent: Nov. 5, 2019

(54) IN-MEMORY MULTI-DIMENSIONAL DATASET WITH INTERROGATION MECHANISM FOR SALESFORCE PLATFORM

(71) Applicant: FinancialForce.com, Inc., San Francisco, CA (US)

(72) Inventors: Stephen Paul Willcock, Harrogate (GB); Bradley West Slater, Leeds (GB); Carolina Ruiz Medina, Harrogate (GB)

(73) Assignee: FinancialForce.com, Inc., San Francisco, CA (US)

(*) Notice: Subject to any disclaimer, the term of this patent is extended or adjusted under 35 U.S.C. 154(b) by 400 days.

(21) Appl. No.: 15/271,186

(22) Filed: Sep. 20, 2016

(65) Prior Publication Data
US 2018/0081921 A1 Mar. 22, 2018

(51) Int. Cl.
*G06F 17/30* (2006.01)
*G06F 16/22* (2019.01)
*G06F 16/28* (2019.01)

(52) U.S. Cl.
CPC ........ *G06F 16/2264* (2019.01); *G06F 16/283* (2019.01)

(58) Field of Classification Search
CPC ........... G06F 16/2264; G06F 17/30333; G06F 17/30477; G06F 17/30554; G06F 17/30592
USPC ........................................................ 707/755
See application file for complete search history.

(56) References Cited

U.S. PATENT DOCUMENTS

| | | | |
|---|---|---|---|
| 9,262,218 B2* | 2/2016 | Bostic | G06F 9/5072 |
| 2010/0088205 A1* | 4/2010 | Robertson | G06Q 20/102 |
| | | | 705/34 |
| 2015/0195344 A1* | 7/2015 | Surendran | H04L 67/10 |
| | | | 709/201 |
| 2017/0048339 A1* | 2/2017 | Straub | G06F 16/2379 |

* cited by examiner

*Primary Examiner* — Jean M Corrielus
(74) *Attorney, Agent, or Firm* — Perkins Coie LLP; Michael A. Glenn

(57) ABSTRACT

Disclosed embodiments include a computer-implemented method performed in a SALESFORCE application development platform. The method includes obtaining data items in the SALESFORCE application development platform. Each data item can include key-values for keys common to the data items and can include a data-item value. The method includes storing each of the data items in an in-memory multi-dimensional dataset of the SALESFORCE application development platform. The multi-dimensional dataset can have a dimension for each of the keys. The method further includes enabling an interrogation process in the SALESFORCE application development platform to read data included in the multi-dimensional dataset.

13 Claims, 9 Drawing Sheets

EXAMPLE PROCESS 400

DATA ITEMS 402

| First name | Last name | Country | City/State | Credit |
|---|---|---|---|---|
| John | Smith | US | Virginia | 10,000 |
| John | Jones | UK | London | 8,000 |
| Paul | Smith | UK | Leeds | 16,000 |

SUB-MAPS 404

| a | b |
|---|---|
| First name | John |
| Last name | Smith |
| Country | US |
| City | Virginia |
| Data (x) = 10,000 | |

| a | b |
|---|---|
| First name | John |
| Last name | Jones |
| Country | UK |
| City | London |
| Data (x) = 8,000 | |

| a | b |
|---|---|
| First name | Paul |
| Last name | Smith |
| Country | UK |
| City | Leeds |
| Data (x) = 16,000 | |

HYPERCUBE 406

| a | b | c(b) |
|---|---|---|
| Map for first name | John | John,Smith,US,Virginia |
| | | John,Jones,UK,London |
| | Paul | Paul,Smith,UK,Leeds |
| Map for last name | Smith | John,Smith,US,Virginia |
| | | Paul,Smith,UK,Leeds |
| | Jones | John,Jones,UK,London |
| Map for country | US | John,Smith,US,Virginia |
| | UK | Paul,Smith,UK,Leeds |
| | | John,Jones,UK,London |
| Map for city / state | Virginia | John,Smith,US,Virginia |
| | London | John,Jones,UK,London |
| | Leeds | Paul,Smith,UK,Leeds |

MAIN DATA MAP 408

| c(b) | Data (x) |
|---|---|
| John,Smith,US,Virginia | 10,000 |
| John,Jones,UK,London | 8,000 |
| Paul,Smith,UK,Leeds | 16,000 |

FIG. 4 (Cont'd)

IN-MEMORY MULTI-DIMENSIONAL DATASET WITH INTERROGATION MECHANISM FOR SALESFORCE PLATFORM

TECHNICAL FIELD

The disclosed teachings generally relate to data processing. The disclosed teachings more particularly relate to an in-memory multi-dimensional dataset in a SALESFORCE platform and a mechanism to interrogate the multi-dimensional dataset.

BACKGROUND

Cloud platforms such as the SALESFORCE platform allow for sharing processing resources and data in a multi-tenant network that offers computing services on demand to customers. More generally, cloud computing enables ubiquitous, on-demand access to a shared pool of configurable computing resources (e.g., networks, servers, storage, applications, and services), which can be rapidly provisioned and released with minimal management effort. The SALESFORCE platform may provide numerous companies with an environment to deploy applications that provide an interface for case management and task management, and a system for automatically handling events.

The SALESFORCE platform can facilitate processing millions, hundreds of millions, or even billions of records while optimizing the performance of data loads and integration into a company's services. However, manipulation of even moderately large datasets on the SALESFORCE platform is difficult due to governors limiting how many times a process can loop through a dataset in any single context. Unfortunately, looping operations are necessary when performing complex calculations using multiple dimensions in a dataset. As such, these constraints limit the ability of the SALESFORCE platform to efficiently query datasets to obtain insights and generate useful outputs.

SUMMARY

Introduced herein is a technique including at least one computer-implemented method and at least one system of a SALESFORCE application development platform ("SALESFORCE platform"). In some embodiments, a method can include obtaining data items in the SALESFORCE platform, where each data item can include key-values for keys common to the data items and can include a data-item value. The method can include storing each of the data items in an in-memory multi-dimensional dataset of the SALESFORCE platform. The multi-dimensional dataset can have a dimension for each of the keys. The method further includes enabling an interrogation process in the SALESFORCE platform to read data included in the multi-dimensional dataset.

In some embodiments, a computer-implemented method performed by a cloud-based platform includes obtaining data items, where each data item can include key-values for keys common to the data items and can include a data-item value. The method can include storing each of the data items in an in-memory multi-dimensional dataset having a dimension for each of the keys; creating a composite key for each data item, where each composite key can include all the key-values of the data item; storing the composite key for each data item in a main data map structure mapping each composite key to a data-item value of the same data item; and enabling an interrogation process to read data included in the multi-dimensional dataset and the main data map structure.

In some embodiments, a computer system utilizing a SALESFORCE platform can include a processor and a memory. The memory includes instructions that, when executed by the processor, can cause the computer system to obtain data items in the SALESFORCE platform, where each data item can include key-values for keys common to the data items and can include a data-item value. The memory can store each of the data items in an in-memory multi-dimensional dataset of the SALESFORCE platform, where the multi-dimensional dataset can have a dimension for each of the plurality of keys, and enable an interrogation process to read data included in the multi-dimensional dataset.

Other aspects of the disclosed embodiments will be apparent from the accompanying figures and detailed description.

This Summary is provided to introduce a selection of concepts in a simplified form that are further explained in the Detailed Description. This Summary is not intended to identify key features or essential features of the claimed subject matter, nor is it intended to be used to limit the scope of the claimed subject matter.

DETAILED DESCRIPTION

Figure 1:
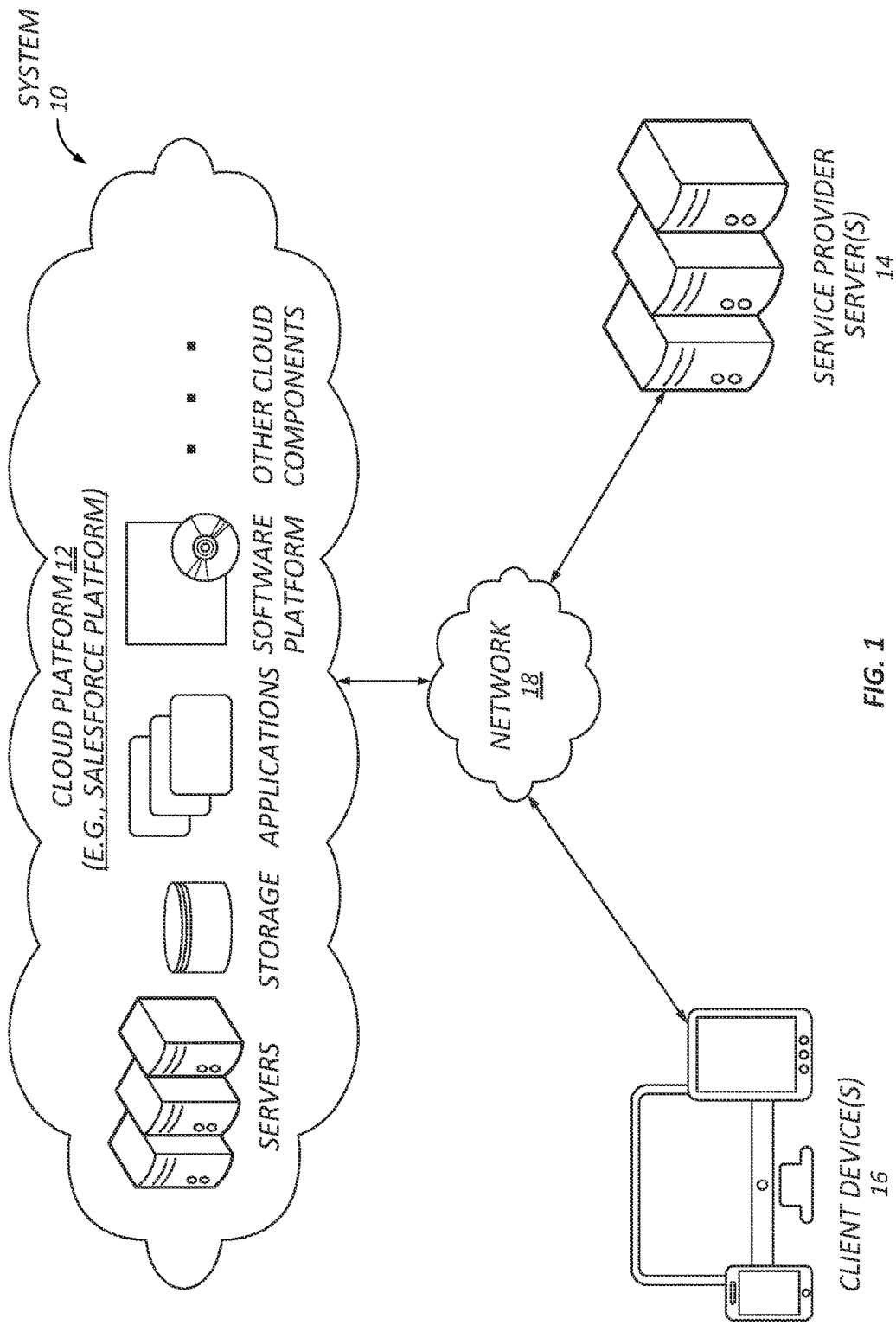
FIG. 1 is a block diagram of a cloud-based system that implements an in-memory multi-dimensional dataset and interrogation mechanism according to some embodiments of the present disclosure.

The embodiments set forth below represent the necessary information to enable those skilled in the art to practice the embodiments, and illustrate the best mode of practicing the embodiments. Upon reading the following description in light of the accompanying figures, those skilled in the art will understand the concepts of the disclosure and will recognize applications of these concepts that are not particularly addressed here. It should be understood that these concepts and applications fall within the scope of the disclosure and the accompanying claims.

The purpose of terminology used herein is only for describing embodiments and is not intended to limit the scope of the disclosure. Where context permits, words using the singular or plural form may also include the plural or singular form, respectively.

As used herein, unless specifically stated otherwise, terms such as "processing," "computing," "calculating," "determining," "displaying," "generating," or the like, refer to actions and processes of a computer or similar electronic computing device that manipulates and transforms data represented as physical (electronic) quantities within the computer's memory or registers into other data similarly represented as physical quantities within the computer's memory, registers, or other such storage medium, transmission, or display devices.

As used herein, terms such as "connected," "coupled," or the like, refer to any connection or coupling, either direct or indirect, between two or more elements. The coupling or connection between the elements can be physical, logical, or a combination thereof.

Processing large volumes of data requires a complex scalable computing infrastructure that is cost-prohibitive to many businesses. As such, businesses turn to cloud computing to use a shared pool of configurable computing resources that provide scalable services for many applications. An example of a cloud-based platform includes the SALESFORCE platform.

Manipulation of even moderately large datasets on a cloud-based platform can be difficult due to constraints imposed to manage multiple users accessing the same cloud-based platform. For example, a cloud-based platform can limit how many times a user can "loop" (e.g., read) through a dataset, which is necessary when performing complex calculations using multiple dimensions in a dataset. These constraints limit the utility of cloud-based platforms to process large volumes of data, which is required by, for example, applications for payroll, billing, customer relationship management, and the like.

The disclosed embodiments overcome these drawbacks with a technique for creating an in-memory multi-dimensional dataset in a cloud-based platform. The technique can also include a mechanism to interrogate the multi-dimensional dataset, to produce useful insights or generate reports. The multi-dimensional dataset can be queried efficiently to retrieve data of interest and eliminate much of the looping that is otherwise required in existing systems to obtain a correct set of data.

In-memory computing can refer to keeping data in volatile memory (e.g., a server's random access memory (RAM)) as a means of processing at faster speeds. In-memory computing applies especially to processing problems that require extensive access to data analytics, reporting or data warehousing, and big data applications. For example, an in-memory database is a database management system that primarily relies on main memory for computer data storage, in contrast to systems that employ a disk storage mechanism. Accordingly, in-memory processing is used for processing data stored in the in-memory database. Because stored data is accessed much more quickly when it is placed in volatile memory, in-memory processing allows data to be analyzed in real time, enabling faster reporting and decision-making in business.

A multi-dimensional dataset is an array of data arranged in a number of dimensions, and is sometimes referred to as a "cube" when the multi-dimensional dataset has three dimensions. A "hypercube" can refer to a multi-dimensional dataset having more than three dimensions. For example, a hypercube that includes financial data may include dimensions corresponding to product, time, country, city, etc. A multi-dimensional dataset can be used in online analytical processing, which is a computer-based technique of analyzing data to look for insights.

The interrogation mechanism may be referred to as a "cursor" used to interrogate the in-memory multi-dimensional dataset to obtain useful insights about the data contained in the multi-dimensional dataset and produce reports of any outputs. For example, the interrogation mechanism can be used to obtain a summary of financial data by product, by time-period, and by city to compare actual and budget expenses.

Hence, creating an in-memory multi-dimensional dataset allows selection and manipulation of data, using any number of dimensions, with a degree of efficiency comparable to selection and manipulation of data of much simpler data structures. The interrogation mechanism allows an application to efficiently step through (e.g., loop) the data, taking a particular perspective. Accordingly, the combination of an in-memory multi-dimensional dataset and cursor provides data processing functionality that is very efficient for arbitrary datasets, which has a particularly high value in cloud-based platforms such as the SALESFORCE platform.

For example, a cloud-based platform can obtain data items, including key-values and data-item values. The data items can be stored in an in-memory multi-dimensional dataset that has a dimension for each of the keys. In some embodiments, a composite key can be created for each data item. The composite key can include all the key-values of the data item. The composite key for each data item can be stored in the multi-dimensional dataset, and in a main data map structure that maps each composite key to a data-item value of the same data item. As a result, the cloud-based platform can enable an interrogation process to read data included in the multi-dimensional dataset and the main data map structure in response to queries related to the data items.

For example, the cloud-based platform can receive a query that includes a key and a key-value. The cloud-based platform can interrogate the multi-dimensional dataset for a composite key by performing a first look-up operation for the queried key-value in a corresponding dimension, and interrogate the main data map for a data-item value by performing a second look-up based on the composite key. The data-item value, or data derived from the data-item value, can thus be returned in response to the query.

The disclosed technique can be described in the context of a billing services add-on application on the SALESFORCE platform because such services typically require processing large volumes of records. However, the disclosed technique has broad applicability to process large volumes of data for any cloud-based services. Further, the disclosed technique could facilitate processing any amount of data to increase throughput and provide useful insights and outputs.

FIG. 1 is a block diagram of a cloud-based system that implements an in-memory multi-dimensional dataset and interrogation mechanism according to some embodiments of the present disclosure. The system 10 includes components, such as a cloud platform 12 (e.g., the SALESFORCE platform), one or more service provider servers 14 that use cloud-based services to provide add-on applications, and one or more client devices 16 that use the add-on applications, all of which are interconnected over a network 18, such as the Internet, to provide processing of a large volume of data.

The network 18 may include any combination of private, public, wired, or wireless portions. Data communicated over the network 18 may be encrypted or unencrypted at various locations or along different portions of the network 18. Each component of the system 10 may include combinations of hardware and/or software to process data, perform functions, communicate over the network 18, and the like. For example, any component of the system 10 may include a processor, memory or storage, a network transceiver, a display, an operating system (OS), and application software (e.g., for providing a user portal), and the like. Other components, hardware, and/or software included in the system 10 are well known to persons skilled in the art and, as such, are not shown or discussed herein.

The cloud platform 12 can provide access to a shared pool of configurable computing resources, including servers, storage, applications, a software platform, networks, services, and the like, accessed by the service provider servers 14 to offer add-on applications to the client devices 16. The cloud platform 12 (e.g., SALESFORCE platform) supports multiple tenants and may be referred to as a platform as a service (PaaS).

The PaaS is provided to developers for creating the add-on applications that run on the components of the cloud platform 12. FORCE.COM is an example of a PaaS that hosts applications hosted on SALESFORCE.COM, which is an example of a cloud platform. For example, add-on applications can provide subscription billing services to users using the client devices 16. The subscription billing services are provided by the service provider servers 14 and include applications built on the software platform of the cloud platform 12.

The service provider servers 14 may include any number of server computers that provide the add-on applications such as subscription billing services, which allow businesses to automatically bill their customers for goods or services on a pre-arranged schedule. The billing services may support installment payments, usage-based billing, and multiple charging methods. Although shown separately from the cloud platform 12, the service provider servers 14 may be included in the cloud platform 12.

The service provider servers 14 may provide or administer a user interface (e.g., website) accessible from the client devices 16. The user interface may include features such as dashboard analytics to provide insight into how a business is performing. Examples of businesses that could benefit from subscription billing services range from software as a service (SaaS) providers to energy and utilities companies.

The add-on applications provided by the service provider servers 14 are built using a particular programming language. For example, FORCE.COM applications are built using APEX (a proprietary Java-like programming language for FORCE.COM) and VISUALFORCE (an XML syntax typically used to generate HTML). The code used to build applications may include functions that are accessible by the add-on applications.

The add-on applications can process volumes of data generated by businesses. For example, the service provider servers 14 can provide subscription billing services that process volumes of billing data generated by businesses that have a large number of customers that are billed routinely for ongoing services. The data may include sales agreements, usage, and pricing, which are used to generate sales invoices to bill customers. As such, voluminous amounts of data are generated continuously.

The disclosed in-memory multi-dimensional dataset can be utilized to look for insights in accordance with a number of computer-based techniques implemented on a cloud-based platform. The data for the multi-dimensional dataset can be obtained from a data warehouse or data management system that may store the data. For example, data can be derived from records stored in tables, and dimensions can be derived from the dimension of tables storing the data. The data can be organized as a hierarchy, a set of parent-child relationships, and the like. As such, a user can navigate through different dimensions, navigate among levels of data, summarize data along a dimension, and the like.

In some embodiments, an in-memory multi-dimensional dataset is created on the SALESFORCE platform and an interrogation mechanism is used to efficiently interrogate the multi-dimensional dataset to produce useful insights in the initial-use case to generate formatted reports. The multi-dimensional dataset allows selection and manipulation of data, using any number of dimensions, with a degree of efficiency comparable to much simpler data structures. The interrogation mechanism allows an application to efficiently loop the data, taking a particular perspective.

The in-memory multi-dimensional dataset and interrogation mechanism combine to produce data processing functionality that is very efficient for arbitrary datasets, which has a particularly high value on platforms such as the SALESFORCE platform. In particular, manipulation of even moderately large datasets on the FORCE.COM platform is usually difficult due to process governors limiting how many times you can 'loop' through a dataset in any single context, which is necessary to perform complex calculations using a multi-dimensional dataset.

Embodiments of the multi-dimensional dataset fulfill the aforementioned requirements as a new type of data structure that can be written in APEX on the SALESFORCE platform. The multi-dimensional dataset can support interrogation from any dimension and serialization so that the data it contains can be efficiently interrogated and stored in a SALESFORCE attachment or object. The multi-dimensional dataset can be N-dimensional, meaning that it can store lists of data by any number of dimensions. Thus, users of the SALESFORCE platform can efficiently access a set of data of interest, and eliminate much of the looping that is otherwise required to find the desired set of data.

Figure 2:
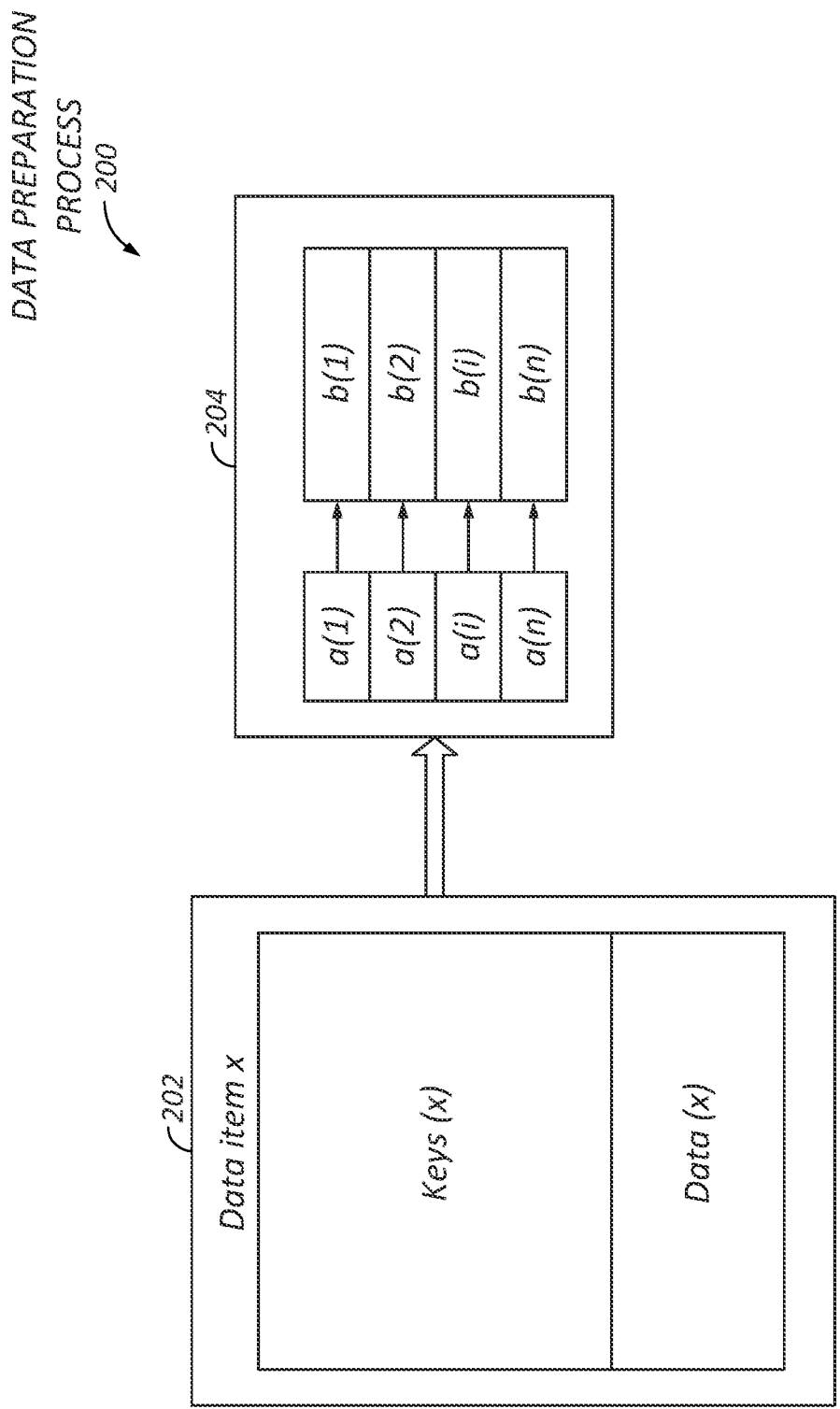
FIG. 2 is a block diagram illustrating a process of preparing data for a multi-dimensional dataset according to some embodiments of the disclosure.

FIG. 2 is a block diagram illustrating a process for preparing data for a multi-dimensional dataset according to some embodiments of the disclosure. The data for a multi-dimensional dataset may be stored in volatile or non-volatile memory. The data may include a variety of data objects and data types known to persons skilled in the art. For example, an in-memory database may include a variety of data objects accessible by a billing application on the SALESFORCE platform. In some embodiments, the data objects stored in the database are unstructured. In-memory processing can be used for processing data stored in the in-memory database, enabling rapid analysis and reporting.

The data obtained for the multi-dimensional dataset may include data items that include key-values and data-item values. For example, a data item may include a billing credit value associated with customer information. In this example, the customer information may include values for a first name, last name, country, and city/state. The values correspond to key-values for the first name, last name, country, and city keys. Moreover, in this example, the credit value corresponds to a data-item value.

As such, step 202 of the data preparation process 200 begins by obtaining a data item x that includes n key-values (x) for n keys and a data-item value data (x). In step 204, the data item x is arranged in a sub-map, which maps an i-th key (denoted by a) to an i-th key-value (denoted by b). For example, a sub-map may include the following mapping between n keys and n key-values (where n=4) for a data item x:

| Key | Key-Values |
|---|---|
| First name | John |
| Last Name | Smith |
| Country | US |
| City/State | Virginia |

A multi-dimensional dataset may have a size determined by the number of keys for the data items that it stores. That is, a multi-dimensional dataset may have n-dimensions that correspond to n-keys of the data items that it stores. As such, the size of a multi-dimensional dataset can be calculated from the size of data items that it stores. Moreover, the data items can be stored in the multi-dimensional dataset in a manner that facilitates subsequent interrogation for data included in the multi-dimensional dataset.

Figure 3:
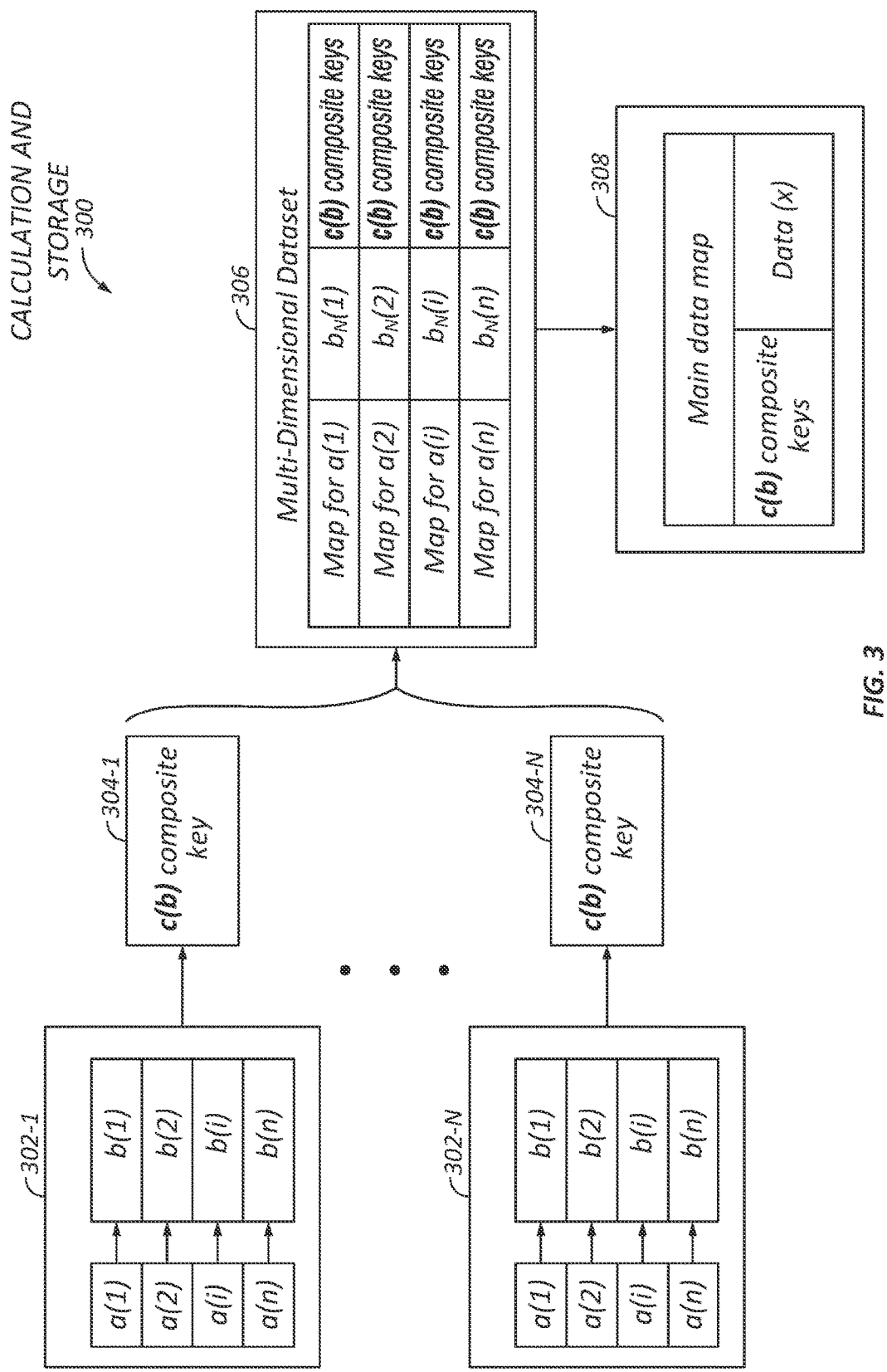
FIG. 3 is a block diagram illustrating an initial process for calculating a size of a multi-dimensional dataset and storing data items in the multi-dimensional dataset according to some embodiments of the disclosure.

For example, FIG. 3 is a block diagram illustrating an initial process 300 for calculating a size of a multi-dimensional dataset and storing data items in the multi-dimensional dataset according to some embodiments of the disclosure. In step 302, the process 300 begins with N sub-maps for N respective data items, each having n key-values b(i) mapped to the same n keys a(i). Each of the N sub-maps may be formed in accordance with the process illustrated in FIG. 2.

In step 304, the n key-values b(i) for each of the N sub-maps are processed to calculate a composite key c(b) for the respective data item. The composite key c(b) may include some or all the key-values b(i) for the respective data item. In some embodiments, the key-values b(1) through b(n) can be flattened into the composite key c(b). As such, a composite key c(b) can be a data string that includes each of the key-values b(1) through b(n) of a corresponding data item. For example, a composite key c(b) for the example introduced above may be "[John, Smith, US, Virginia]."

In step 306, a multi-dimensional dataset is created that includes n dimensions corresponding to the n keys common to each data item. As a result, the dimensionality of the multi-dimensional dataset governs how many [key, key-value] pairs are provided with each data item. The multi-dimensional dataset stores the contents of the N sub-maps and respective composite keys c(N) in a manner that facilitates subsequent interrogation for data contained in the multi-dimensional dataset. As shown, each dimension of the multi-dimensional dataset includes the N key-values b(i) for the respective keys a(i).

In some embodiments, the n key-values b(i) of the respective key a(i) may be represented by fewer key-values when there are duplicates of any key-values b(i). For example, n key-values can be represented by m key-values in the multi-dimensional dataset where M<n because at least some of the n key-values are duplicate values. Each key-value b(i) for each dimension of the multi-dimensional dataset is mapped to each composite key c(b) that includes the same key-value b(i).

In step 308, a main data map can be created. The main data map is structured to include the composite keys c(b) for each of the N data items mapped to a respective data-item value. For example, a main data map structure may include N composite keys c(b) mapped to N data-item values for N data items. In some embodiments, the main data map structure is part of the multi-dimensional dataset. In some embodiments, the main data map is a data structure that is separate and distinct from the multi-dimensional dataset, and can be stored separate from or along with the multi-dimensional dataset (e.g., in-memory).

Figure 4:
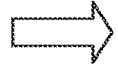
FIG. 4 is a block diagram illustrating a particular example of implementing a process for creating a multi-dimensional dataset and main data map for subsequent interrogation according to some embodiments of the present disclosure.
Figure 4:

FIG. 4 is a block diagram illustrating a particular example implementing a process 400 for creating a multi-dimensional dataset and main data map, for subsequent interrogation, according to some embodiments of the present disclosure. In particular, FIG. 4 shows a non-limiting example of a process meant to aid in understanding how data structures are created and how data items are stored to subsequently facilitate data interrogation according to the disclosed embodiments.

In step 402, three data items are shown in respective rows of a table. The table has five columns. The first four columns represent four keys common to each data item. The remaining column represents data-item values for the data items. The four keys [first name, last name, country, and city/state] and data item value [credit] have values for each of the three data items. Hence, the three data items will be stored in an in-memory four-dimensional dataset (e.g., a hypercube).

In step 404, a sub-map is created for each of the three data items. Each of the three sub-maps maps keys to key-values for a respective data item. As such, each sub-map includes [key, key-value] pairs and a data-item value for the respective data item. The in-memory hypercube can store the data from the three sub-maps.

In step 406, the in-memory hypercube is illustrated with four dimensions [first name, last name, country, city/state]. Each dimension represents a key a(i). Each key is mapped to key-values b(i) for corresponding keys a(i). Lastly, each dimension includes a list of all three composite keys c(b) mapped to corresponding key-values b(i).

For example, the "first name" key represents one of four dimensions of the hypercube. The "first name" dimension is mapped to the "first name" key-values [John, John, Paul] of the three data items. Note, however, that the hypercube only shows two "first name" key-values [John, Paul] even though there are three data items. This results because one key-value [John] is the same key-value for two of the three data items. As such, the hypercube can consolidate duplicate key-values.

Each dimension includes all three composite keys [John, Smith, US, Virginia], [John, Jones, UK, London], and [Paul, Smith, US, Leeds] for the data items. The composite keys are mapped to key-values for the respective dimension where the key-values are included on the respective composite keys. For example, the [John, Smith, US, Virginia] and [John, Jones, UK, London] composite keys include the "first name" key-value "John." As such, these composite keys are mapped to the key-value "John" of the "first name" dimension.

Lastly, in step 408, a main data map structure is illustrated as including the three composite keys mapped to corresponding data-item values. The main data map may be part of the hypercube, or may be separate and distinct from the hypercube. As described below, structuring a hypercube and main data map in this manner facilitates subsequent interrogation of the data included in the hypercube.

The multi-dimensional dataset (e.g., hypercube) can be interrogated to respond to queries based on an analysis of the data included in the multi-dimensional dataset. In particular, an interrogation mechanism, referred to as a "cursor," can loop through (i.e., read) the data of the multi-dimensional dataset to respond to the queries.

The multi-dimensional dataset and cursor combine to provide users with the ability to interrogate complex data within the SALESFORCE platform (in APEX) for the purpose of reporting. The results of the query can be returned in a human readable format. For example, the cursor can generate a table by looping through a multi-dimensional dataset.

In some embodiments, the cursor can apply a user-defined order to an unordered multi-dimensional dataset, and allow for reading some or all of its data by looping through the multi-dimensional dataset. Moreover, the multi-dimensional dataset can use set theory principles to quickly calculate and return data based on any query, per dimension, passed to it by other processes. The returned data can be rendered as a formatted report (e.g., a two-dimensional table).

For example, referring back to FIG. 4, a query may ask "What data items exist where the last name is Smith?". A process to respond to this query may include the cursor first performing a look-up operation in the "last name" dimension of the hypercube for the value "Smith." In response, the composite keys [John, Smith, US, Virginia] and [Paul, Smith, UK, Leeds] are returned. The process can then continue by performing a look-up operation of [John, Smith, US, Virginia] and [Paul, Smith, UK, Leeds] in the main data map structure. In response, the data-item values [10000, 16000] are returned, which is the answer to the query.

In some embodiments, the cursor can perform complex operations to respond to complex queries. For example, a query may be "What is the total credit of people with the last name Smith?" In response, the cursor would proceed in accordance with the process detailed above to retrieve the data-item values [10000, 16000], and perform an additional operation by summing the two data-item values to provide the answer [26,000] to the query. In some embodiments, the cursor can perform any number of operations on retrieved values. For example, retrieved data-item values can be quickly summed, averaged, or the like, to answer a variety of questions.

Hence, the cursor can be used to generate a simple or complex report from the data included in the multi-dimensional dataset. For example, the report can be a table or spreadsheet that includes data from the multi-dimensional dataset rendered in human readable form. To display multi-dimensional data in human readable form, the retrieved data can be readily caste by the cursor into a two-dimensional table (e.g., spreadsheet or pivot table). As such, the retrieved data can then be added to a user interface on a display screen or included in a report.

Figures 5, 6:
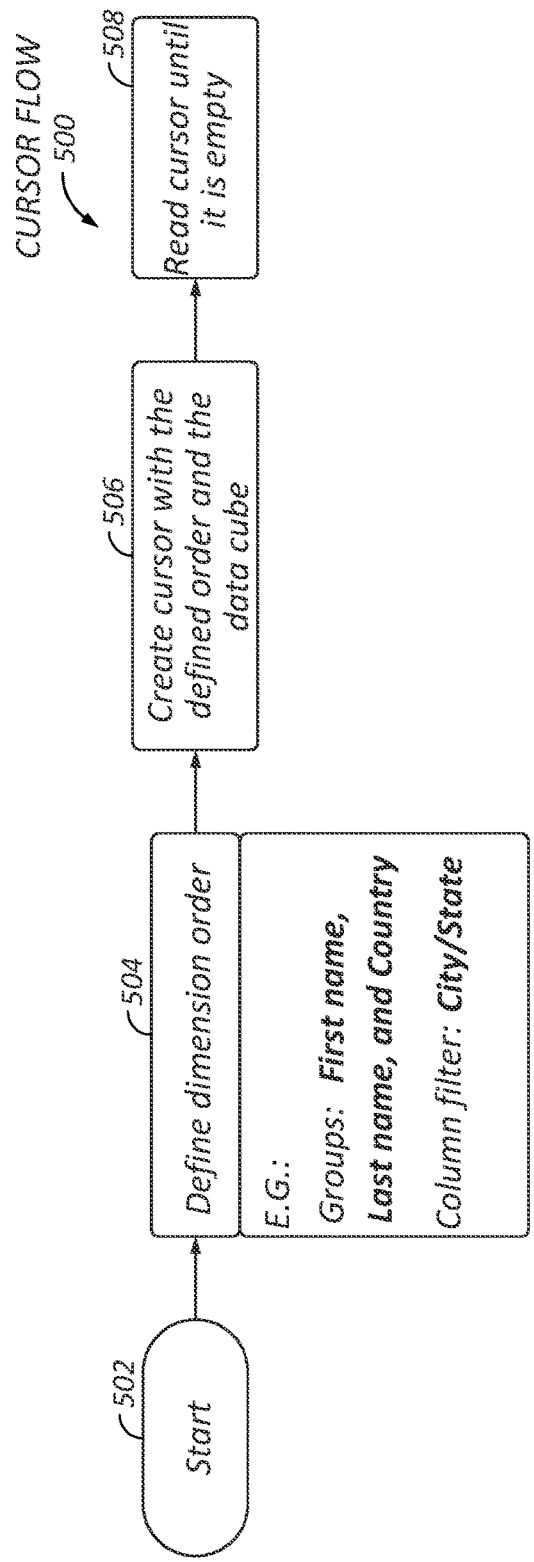
FIG. 5 is a flowchart illustrating a process for interrogating the multi-dimensional dataset according to some embodiments of the present disclosure.
FIG. 6 is a block diagram illustrating a two-dimensional table created in accordance with the process of FIG. 5 according to some embodiments of the present disclosure.

FIG. 5 is a flowchart illustrating a process for interrogating the multi-dimensional dataset according to some embodiments of the present disclosure. In some embodiments, the cursor is separate and distinct from, but operates on, the multi-dimensional dataset and/or the main data map, and a looping operation is said to be performed by the cursor to return results. The process 500 commences in step 502 by initiating cursor operations to loop through data of a multi-dimensional dataset. In step 504, the cursor defines dimensions of the multi-dimensional dataset upon which the looping operation is performed ("groups"). For example, the cursor may define [first name, last name, country] as groups for the looping. In some embodiments, the cursor may also define an order for the dimensions. This may define the order for looping through dimensions or outputting results from dimensions.

In some embodiments, the cursor may define a filter (e.g., "column filter") that is applied to the groups to output data-item values for the groups in accordance with the column filter. For example, a column filter of [city/state] can be defined and applied to the [first name, last name, country] groups to output the key-values for the groups and the data-item values for the groups arranged according to [city/state].

In step 506, the cursor is created in accordance with the defined order and the multi-dimensional dataset (e.g., the hypercube of FIG. 4). Lastly, in step 508, the interrogation process involves performing a looping operation to read through the multi-dimensional dataset until empty (e.g., until all the contents have been read). The results of looping through the cursor can be output in a variety of ways, including being rendered on a display screen or included in reports.

FIG. 6 illustrates a two-dimensional table created in accordance with the process of FIG. 5 according to some embodiments of the present disclosure. Hence, the table of FIG. 6 shows a particular example of an output produced by implementing a cursor on a multi-dimensional dataset. Moreover, the table of FIG. 6 illustrates how a cursor can implement an order for the hypercube of FIG. 4, such that the output of the retrieved data is rendered in accordance with that order in a human-readable manner. Hence, the table can be used as a report to analyze the cube.

As shown, the three leftmost columns of the table correspond to each of the three groups [first name, last name, country] defined in step 504 of FIG. 5. The rightmost three columns correspond to the filtered column [city/state], also defined in step 504. That is, the three rightmost columns correspond to the three key-values of each data item [Virginia, London, Leeds]. The data-item value for a data item is included in the column that matches the [city/state] key-value of that data item. As such, each [city/state] column includes a single data-item value for the matching data item. Thus, the data read by performing the looping operation on the cube can be included in a formatted table as a visualization of the results.

Figure 7:
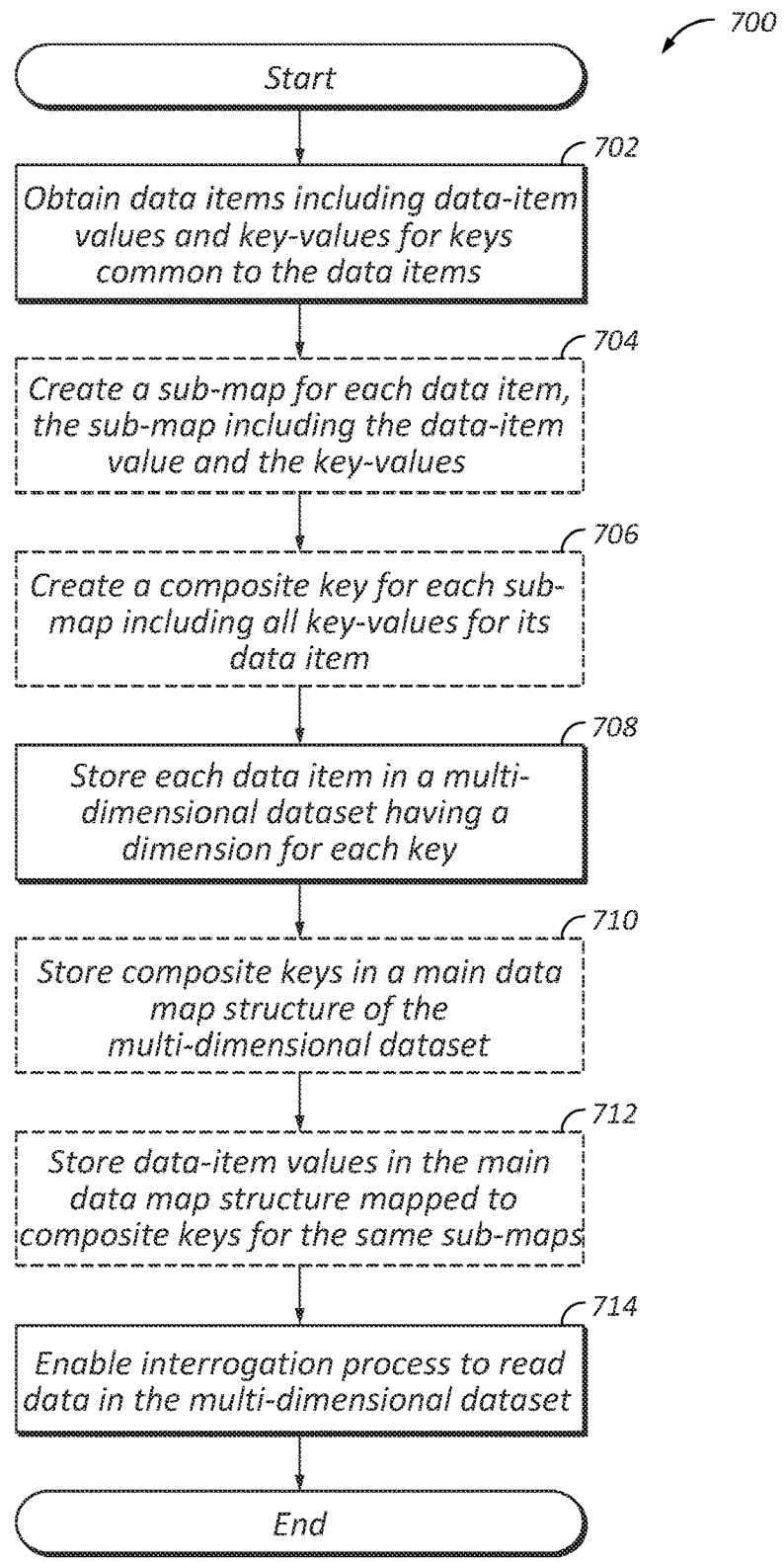
FIG. 7 is a flowchart illustrating a method for creating a multi-dimensional dataset according to some embodiments of the present disclosure.

FIG. 7 is a flowchart illustrating a method for creating a multi-dimensional dataset according to some embodiments of the present disclosure. In some embodiments, the method 700 is implemented in a cloud-based platform such as the SALESFORCE platform. In step 702, one or more data items are obtained. For example, the data items can be retrieved from a database warehouse in volatile or non-volatile memory. The data items can each include a key-value for each of one or more keys that are common to all the data items. The data items may each also include a data-item value.

In some embodiments, the data items are stored in sub-maps before being stored in a multi-dimensional dataset. For example, in step 704, a sub-map is created for each of the data items, which can also be kept in-memory. The sub-map can include the data-item value and the key-values for the data item.

In some embodiments, a composite key can be created from each sub-map. For example, in step 706, a composite key is created as a data string including all the key-values of the sub-map. As such, the composite key can flatten all the key-values of a data item into a single data string, which can subsequently be used to interrogate the data item for a data-item value.

In step 708, each of the data items can be stored in an in-memory multi-dimensional dataset such as a hypercube. The multi-dimensional dataset has a dimension for each of the keys common to the data items. In some embodiments, each dimension includes the corresponding key-values for the data items, and each key-value is mapped to a composite key for each sub-map that includes the key-value. In some embodiments, each dimension can have a minimal number of key-values that represent all the key-values for the key of the dimension. For example, duplicate key-values may be consolidated to minimize the number of key-values in a dimension.

In some embodiments, a main data map structure is created, which includes the composite keys mapped to a data-item value for each data item. For example, in step 710, the composite key of each sub-map is stored in the main data map structure. In some embodiments, the main data map structure is part of the multi-dimensional dataset. In some embodiments, the main data map structure is separate and distinct from the multi-dimensional dataset. In step 712, the data-item value of each sub-map can be stored in the main data map structure such that the data-item value is mapped to a composite key for the same sub-map. As a result, in step 714, the multi-dimensional dataset is enabled to facilitate an interrogation process to read data included in the multi-dimensional dataset.

Figure 8:
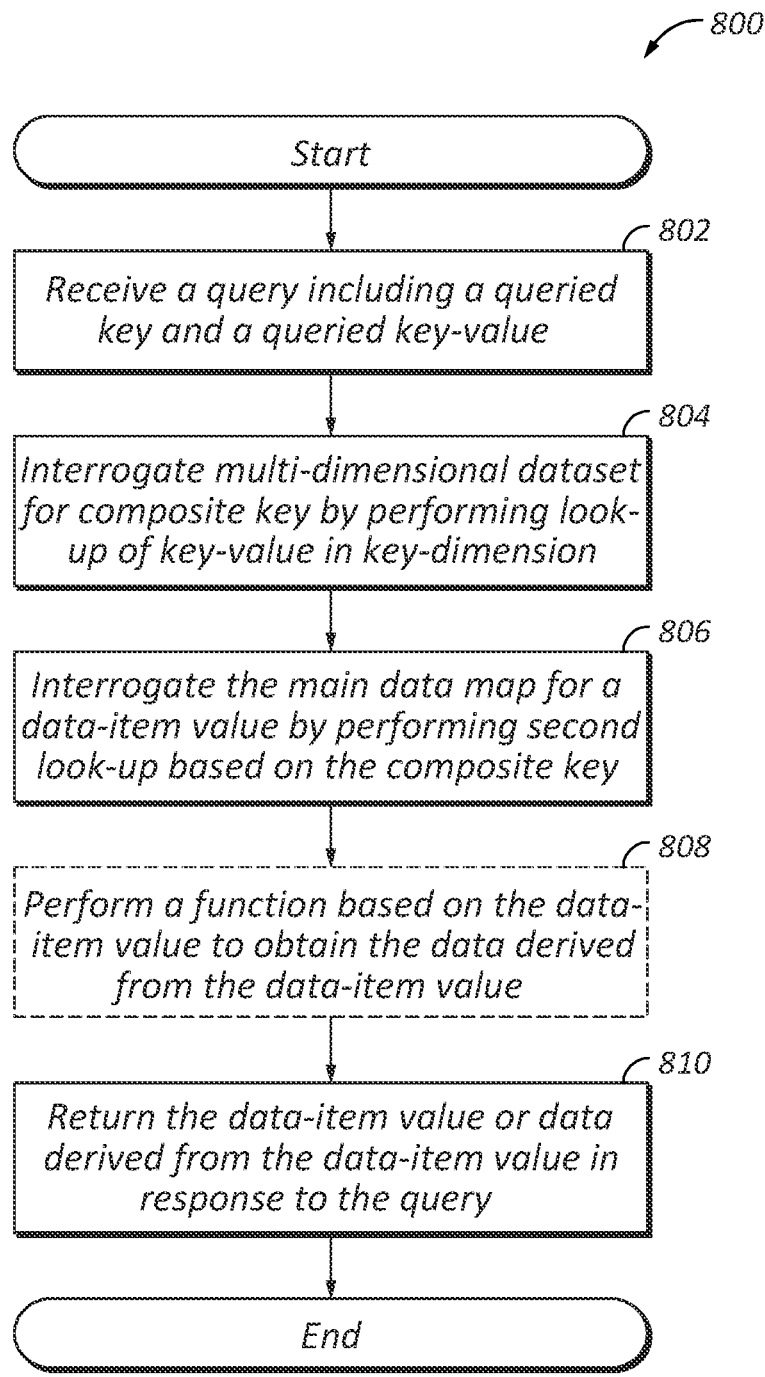
FIG. 8 is a flowchart illustrating a method for interrogating the multi-dimensional dataset according to some embodiments of the present disclosure.

FIG. 8 is a flowchart illustrating a method 800 for interrogating the multi-dimensional dataset according to some embodiments of the present disclosure. In step 802, a query including a key and a key-value is received. For example, a query may be submitted by a user of an add-on application operating on the SALESFORCE platform. The query may be in a human-readable format such as a question related to data included in the multi-dimensional dataset.

In step 804, a look-up operation is performed on a dimension of the multi-dimensional dataset for the composite key matching the key and key-value included in the query. In step 806, the matching composite key is used to perform another look-up operation on the main data map structure for the data-item value matching the composite key. As such, a data-item value can be returned in response to the query.

In some embodiments, one or more functions can be performed to obtain data derived from data-item values in response to complex queries. As such, in step 808, a function can be performed on the data-item value to obtain data derived from the data-item value. For example, the function may involve a sum or average of multiple data-item values retrieved in response to a complex query. Lastly, in step 810, the data-item value or data derived from data-item values is returned in response to the query.

In some embodiments, the interrogation mechanism may define one or more groups and/or filters based on any of the keys of the data items. For example, the query may include a subset of keys used to define a combination of groups and filters to interrogate the multi-dimensional dataset or main data map structure. As such, the interrogation mechanism can operate on the multi-dimensional dataset in accordance with the defined groups and filters. Then, one or more looping processes can be performed to read all the contents associated with the cursor in response to a query, in accordance with the process detailed above.

In some embodiments, a user can instruct the interrogation mechanism to define the groups and filters, and the groups can further be defined to have a sequential order. As a result, the interrogation mechanism can generate a report that includes the data obtained by interrogating the multi-dimensional dataset and/or main data map structure. In some embodiments, the report can be rendered as a two-dimensional table (e.g., spreadsheet) that includes a row for each data item, and sequentially-ordered columns corresponding to the sequentially-ordered groups, as well as a column for each key-value of the filter, such that cells for each data item include key-values and a data-item value.

Figure 9:
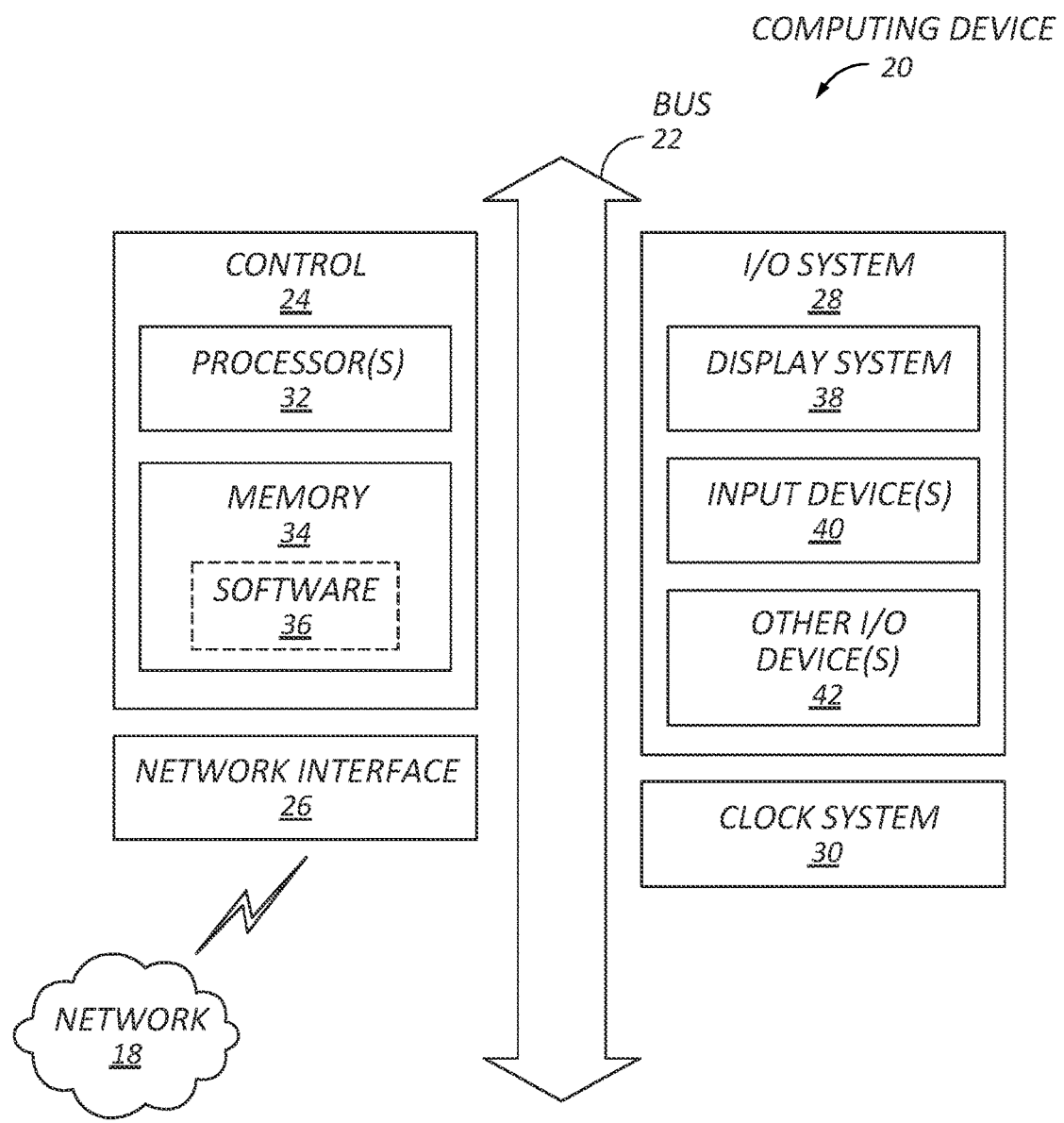
FIG. 9 is a block diagram illustrating a computing device that is operable to implement the disclosed technology according to some embodiments of the present disclosure.

FIG. 9 is a block diagram illustrating a computing device operable to implement the disclosed technology according to some embodiments of the present disclosure. As shown, a computing device 20 includes a bus 22 that is operable to transfer data between hardware components. These components include a control 24 (e.g., processing system), a network interface 26, an input/output (I/O) system 28, and a clock system 30. The computing device 20 may include other components that are not shown nor further discussed for the sake of brevity. One having ordinary skill in the art will understand any hardware and software that is included but not shown in FIG. 9.

The control 24 includes one or more processors 32 (e.g., central processing units (CPUs), application-specific integrated circuits (ASICs), and/or field programmable gate arrays (FPGAs)), and memory 34 (which may include software 36). For example, the memory 34 may include volatile memory (e.g., RAM) and/or non-volatile memory (e.g., read-only memory (ROM)). The memory 34 can be local, remote, or distributed.

A software program (e.g., software 36), when referred to as "implemented in a computer-readable storage medium," includes computer-readable instructions stored in the memory (e.g., memory 34). A processor (e.g., processor 32) is "configured to execute a software program" when at least one value associated with the software program is stored in a register that is readable by the processor. In some embodiments, routines executed to implement the disclosed embodiments may be implemented as part of OS software (e.g., Microsoft Windows® and Linux®) or a specific software application, component, program, object, module, or sequence of instructions referred to as "computer programs."

As such, the computer programs typically comprise one or more instructions set at various times in various memory devices of a computer (e.g., computing device 20), which, when read and executed by at least one processor (e.g., processor 32), will cause the computer to perform operations to execute features involving the various aspects of the disclosed embodiments. In some embodiments, a carrier containing the aforementioned computer program product is provided. The carrier is one of an electronic signal, an optical signal, a radio signal, or a non-transitory computer-readable storage medium (e.g., memory 34).

The network interface 26 may include a modem or other interfaces (not shown) for coupling the computing device 20 to other computers over the network 18. The I/O system 28 may operate to control various other I/O devices 42, including peripheral devices such as a display system 38 (e.g., a monitor or touch-sensitive display), and one or more input devices 40 (e.g., a keyboard and/or pointing device). Other I/O devices 42 may include, for example, a disk drive, printer, scanner, or the like. Lastly, the clock system 30 controls a timer for use by the disclosed embodiments.

Operation of a memory device (e.g., memory 34), such as a change in state from a binary one (1) to a binary zero (0) (or vice versa), may comprise a visually perceptible physical change or transformation. The transformation may comprise a physical transformation of an article to a different state or thing. For example, a change in state may involve an accumulation and storage of charge or a release of stored charge. Likewise, a change of state may comprise a physical change or transformation in magnetic orientation or a physical change or transformation in molecular structure, such as a change from crystalline to amorphous or vice versa.

Aspects of the disclosed embodiments may be described in terms of algorithms and symbolic representations of operations on data bits stored in memory. These algorithmic descriptions and symbolic representations generally include a sequence of operations leading to a desired result. The operations require physical manipulations of physical quantities. Usually, though not necessarily, these quantities take the form of electric or magnetic signals that are capable of being stored, transferred, combined, compared, and otherwise manipulated. Customarily, and for convenience, these signals are referred to as bits, values, elements, symbols, characters, terms, numbers, or the like. These and similar terms are associated with physical quantities and are merely convenient labels applied to these quantities.

While embodiments have been described in the context of fully functioning computers, those skilled in the art will appreciate that the various embodiments are capable of being distributed as a program product in a variety of forms and that the disclosure applies equally, regardless of the particular type of machine or computer-readable media used to actually effect the embodiments.

While the disclosure has been described in terms of several embodiments, those skilled in the art will recognize that the disclosure is not limited to the embodiments described herein and can be practiced with modifications and alterations within the spirit and scope of the invention. Those skilled in the art will also recognize improvements to the embodiments of the present disclosure. All such improvements are considered within the scope of the concepts disclosed herein. Thus, the description is to be regarded as illustrative instead of limiting.

The invention claimed is:

1. A computer-implemented method performed in a SALESFORCE application development platform, the method comprising:
    obtaining a plurality of data items in the SALESFORCE application development platform, each data item including a key-value for each of a plurality of keys common to the plurality of data items and including a data-item value;
    creating a sub-map for each of the plurality of data items in the SALESFORCE application development platform, each sub-map including the data-item value and the key-values for the data item;
    creating a composite key for each sub-map, each composite key being a data string including all the key-values of the sub-map;
    storing each of the plurality of data items from the plurality of sub-maps in an in-memory multi-dimensional dataset of the SALESFORCE application development platform, the multi-dimensional dataset having a dimension for each of the plurality of keys;
    storing each composite key of each sub-map in a main data map structure of the multi-dimensional dataset, each dimension of the multi-dimensional dataset having a minimal number of key-values representing all key-values for the key of the dimension, and each key-value being associated with the composite key for each sub-map that includes the key-value;
    storing the data-item value for each sub-map in the main data map structure such that the data-item value is mapped to the composite key of the sub-map;
    enabling an interrogation process in the SALESFORCE application development platform to read data included in the multi-dimensional dataset;
    defining one or more groups and filters from keys of the plurality of keys;
    creating an interrogation mechanism in the SALESFORCE application development platform, the interrogation mechanism including the one or more groups and filters; and
    performing the interrogation process by reading all contents of the multi-dimensional dataset in accordance with the one or more groups and filters.

2. The method of claim 1, wherein the one or more groups have a sequential order.

3. The method of claim 2, further comprising:
    generating a report comprising data obtained by performing the interrogation process.

4. The method of claim 3, wherein the report is rendered as a two-dimensional spreadsheet including a row for each data item and a plurality of columns, the plurality of columns including sequentially ordered columns corresponding to the sequentially ordered groups and a column for each key-value of the filter such that cells for each data item include key-values and a data-item value.

5. A computer system utilizing a SALESFORCE application development platform, the computer system comprising:
    a processor; and
    a memory that includes instructions which, when executed by the processor, cause the computer system to:
        obtain a plurality of data items in the SALESFORCE application development platform, each data item including a key-value for each of a plurality of keys common to the plurality of data items and including a data-item value;
        create a sub-map for each of the plurality of data items in the SALESFORCE application development platform, each sub-map including the data-item value and the key-values for the data item;
        create a composite key for each sub-map, each composite key being a data string including all the key-values of the sub-map;
        store each of the plurality of data items from the plurality of sub-maps in an in-memory multi-dimensional dataset of the SALESFORCE application development platform, the multi-dimensional dataset having a dimension for each of the plurality of keys;
        store each composite key of each sub-map in a main data map structure, the main data map structure being part of the multi-dimensional dataset;
        store the data-item value for each sub-map in the main data map structure such that the data-item value is mapped to the composite key for a same sub-map;
        enable an interrogation process in the SALESFORCE application development platform to read data included in the multi-dimensional dataset, wherein each dimension of the multi-dimensional dataset has a minimal number of key-values representing all key-values for the key of the dimension, and each key-value is associated with the composite key for each sub-map that includes the key-value;
        define one or more groups and filters from keys of the plurality of keys;
        create an interrogation mechanism in the SALESFORCE application development platform, the interrogation mechanism including the one or more groups and filters, and being operable on the multi-dimensional dataset; and perform an interrogation process by reading all contents of the multi-dimensional dataset in accordance with the one or more groups and filters.

6. The system of claim 5, wherein the one or more groups have a sequential order.

7. The system of claim 6, wherein the computer system to further caused to:
generate a report comprising data obtained by performing the interrogation process.

8. The system of claim 7, wherein the report is rendered as a two-dimensional spreadsheet including a row for each data item and a plurality of columns, the plurality of columns including sequentially ordered columns corresponding to the sequentially ordered groups and a column for each key-value of the filter such that cells for each data item include key-values and a data-item value.

9. A computer-implemented method performed in a SALESFORCE application development platform, the method comprising:
obtaining a plurality of data items in the SALESFORCE application development platform, each data item including a key-value for each of a plurality of keys common to the plurality of data items and including a data-item value;
storing each of the plurality of data items in an in-memory multi-dimensional dataset of the SALESFORCE application development platform, the multi-dimensional dataset having a dimension for each of the plurality of keys;
creating a composite key for each data item, each composite key including all the key-values of the data item;
storing each composite key for each data item in a main data map structure that maps each composite key to a data-item value of the data item;
enabling an interrogation process in the SALESFORCE application development platform to read data included in the multi-dimensional dataset;
receiving a query including a queried key and a queried key-value;
interrogating the multi-dimensional dataset for the composite key by performing a first look-up operation for the queried key-value in a corresponding dimension;
interrogating the main data map for a data-item value by performing a second look-up based on the composite key; and
returning the data-item value or data derived from the data-item value in response to the query.

10. The method of claim 9, wherein each dimension of the multi-dimensional dataset has a minimal number of key-values required to represent all key-values for the key of the dimension.

11. The method of claim 9, further comprising, prior to returning the data derived from the data-item value:
performing a function based on the data-item value to obtain the data derived from the data-item value.

12. The method of claim 11, wherein the function is a sum or average function including the data-item value.

13. The method of claim 9, wherein the query is in a human-readable format.

\* \* \* \* \*